United States Patent
Deshpande

(10) Patent No.: US 7,502,893 B2
(45) Date of Patent: Mar. 10, 2009

(54) SYSTEM AND METHOD FOR REPORTING CACHE COHERENCY STATE RETAINED WITHIN A CACHE HIERARCHY OF A PROCESSING NODE

(75) Inventor: Sanjay R. Deshpande, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 308 days.

(21) Appl. No.: 11/553,146

(22) Filed: Oct. 26, 2006

(65) Prior Publication Data

US 2008/0104330 A1 May 1, 2008

(51) Int. Cl.
*G06F 12/00* (2006.01)
(52) U.S. Cl. .................. 711/141; 711/144; 711/146
(58) Field of Classification Search ............. 711/141, 711/144, 145, 146, 154, 156
See application file for complete search history.

(56) References Cited

U.S. PATENT DOCUMENTS

| | | | |
|---|---|---|---|
| 5,832,534 A | 11/1998 | Singh et al. | |
| 5,903,908 A | 5/1999 | Singh et al. | |
| 5,960,457 A * | 9/1999 | Skrovan et al. | 711/146 |
| 6,122,712 A | 9/2000 | Torii | |
| 6,304,945 B1 | 10/2001 | Koenen | |
| 6,519,685 B1 | 2/2003 | Chang | |
| 6,694,409 B2 | 2/2004 | Chang | |
| 7,334,089 B2 * | 2/2008 | Glasco | 711/143 |
| 7,366,847 B2 * | 4/2008 | Kruckemyer et al. | 711/144 |
| 2003/0097529 A1 * | 5/2003 | Arimilli et al. | 711/141 |
| 2003/0115423 A1 | 6/2003 | Chang | |
| 2003/0225980 A1 * | 12/2003 | Henry et al. | 711/144 |
| 2004/0111563 A1 | 6/2004 | Edirisooriya et al. | |
| 2004/0236912 A1 * | 11/2004 | Glasco | 711/141 |
| 2005/0160226 A1 | 7/2005 | Averill et al. | |
| 2007/0186054 A1 * | 8/2007 | Kruckemyer et al. | 711/144 |

* cited by examiner

*Primary Examiner*—Jack A Lane

(57) ABSTRACT

A coherency state of a coherency granule is determined for each of a plurality of caches of a processor of a multiple-processor system to generate a plurality of coherency states in response to receiving a memory transaction request associated with the coherency granule at the processor. A coherency state of the coherency granule retained at the processor subsequent to the memory transaction request is determined based on the plurality of coherency states and an indicator representative of the coherency state of the coherency granule retained at the processor is provided for receipt by a cache coherency directory.

20 Claims, 3 Drawing Sheets

SYSTEM AND METHOD FOR REPORTING CACHE COHERENCY STATE RETAINED WITHIN A CACHE HIERARCHY OF A PROCESSING NODE

FIELD OF THE DISCLOSURE

The present disclosure relates generally to multiple-processor systems and more particularly to cache coherency in multiple-processor systems.

BACKGROUND

Multiple-processor systems generally are configured so that many regions of a memory are shared by more than one processor. Typically, each processor utilizes one or more local caches to maintain copies of data accessed from shared memory. Due to the shared nature of the memory and its stored data, multiple-processor systems typically utilize a cache coherency protocol in an attempt to maintain all of the caches in a state of coherence so that a change to the local copy of a shared memory location can propagate to other processors as necessary. One conventional cache coherency technique includes the use of a coherency directory at each processing node that stores the cache state for each local memory location shared with other processing nodes. In response to processing a memory transaction request for a memory location, each processor of the processing node reports compliance with the coherency requirements of the memory transaction request. The coherency directory updates its coherency state information based on assumptions made from the reported compliance and routes subsequent memory transaction requests based on the cache state information for the memory locations associated with the memory transaction requests. However, these coherency compliance reports often are misleading or incomplete in conventional directory-based coherency systems as they fail to establish with any certainty the actual coherency state of the accessed memory location for the processor. Rather, these coherency compliance responses typically only acknowledge compliance with the coherency requirements associated with the memory transaction. Accordingly, it will be appreciated that an improved technique for directory-based cache coherency management would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In accordance with one aspect of the present disclosure, a method includes determining, at a first processor of a multiple-processor system, a coherency state of a coherency granule for each of a plurality of caches of the processor to generate a plurality of coherency states in response to receiving a memory transaction request associated with the coherency granule at the processor. The method further includes determining, at the processor, a coherency state of the coherency granule retained at the processor subsequent to the memory transaction request based on the plurality of coherency states. The method additionally includes providing an indicator representative of the coherency state of the coherency granule retained at the processor for receipt by a cache coherency directory.

In accordance with another aspect of the present disclosure, a method includes receiving, at a processor of a multiple-processor system, a memory transaction request associated with a coherency granule. The method further includes processing the memory transaction request at the processor to determine a compliance with a coherency requirement of the memory transaction request. The method additionally includes determining a coherency state of the coherency granule retained at the processor subsequent to the memory transaction request, and providing a first indicator representative of the compliance with the coherency requirement and a second indicator representative of the second coherency state for receipt by a cache coherency directory associated with the multiple-processor system.

In accordance with yet another aspect of the present disclosure, a system includes a processor. The processor includes a port configured to couple to a transaction management module associated with a plurality of processors, a processor core, and a plurality of caches. The processor further includes a coherency management module configured to provide an indicator representative of a coherency state of the coherency granule retained at the plurality of caches subsequent to a processing of a memory transaction request associated with the coherency granule.

Figure 1:
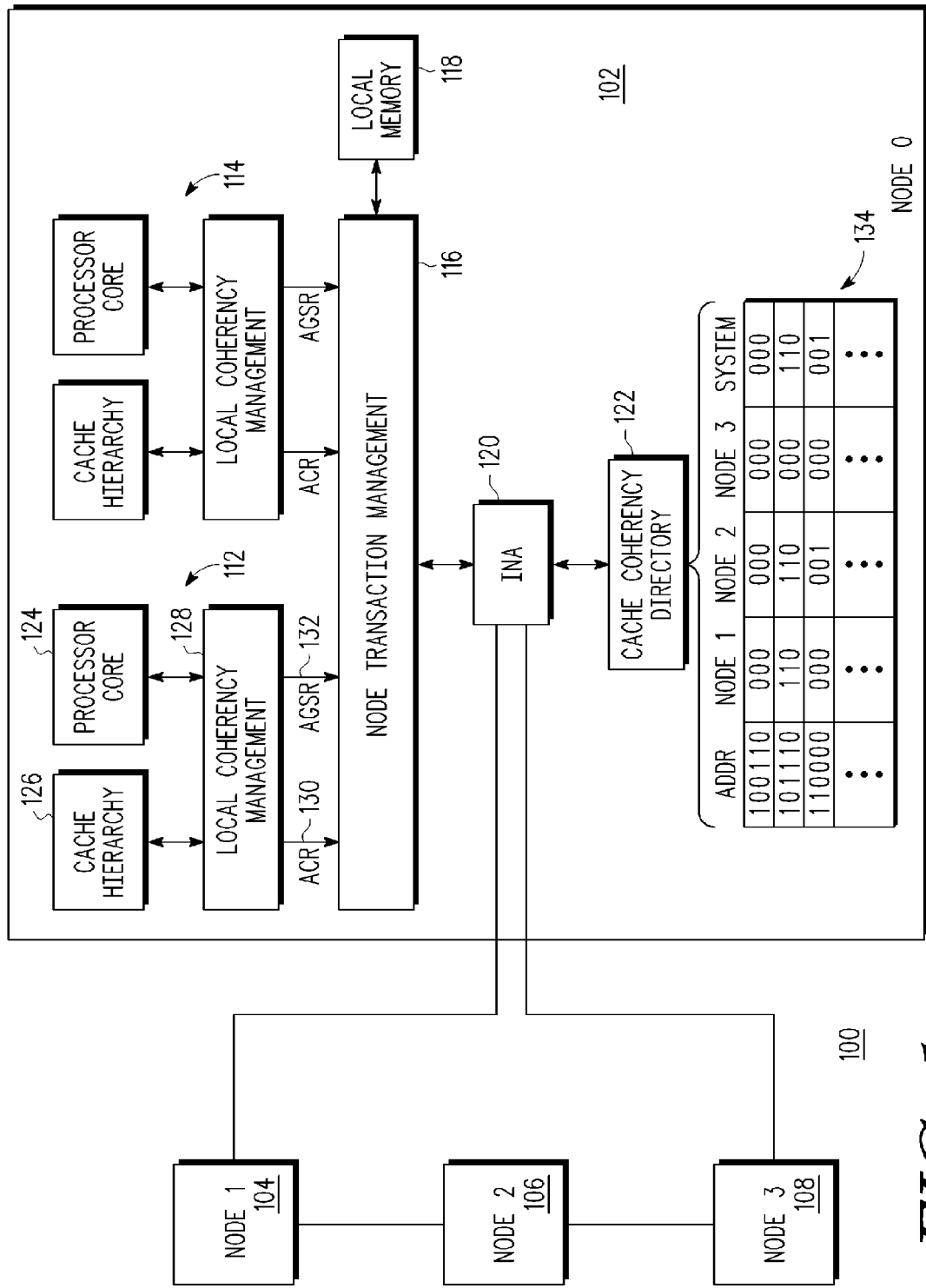
FIG. 1 is a block diagram illustrating a multiple-processor system in accordance with at least one embodiment of the present disclosure.
Figure 2:
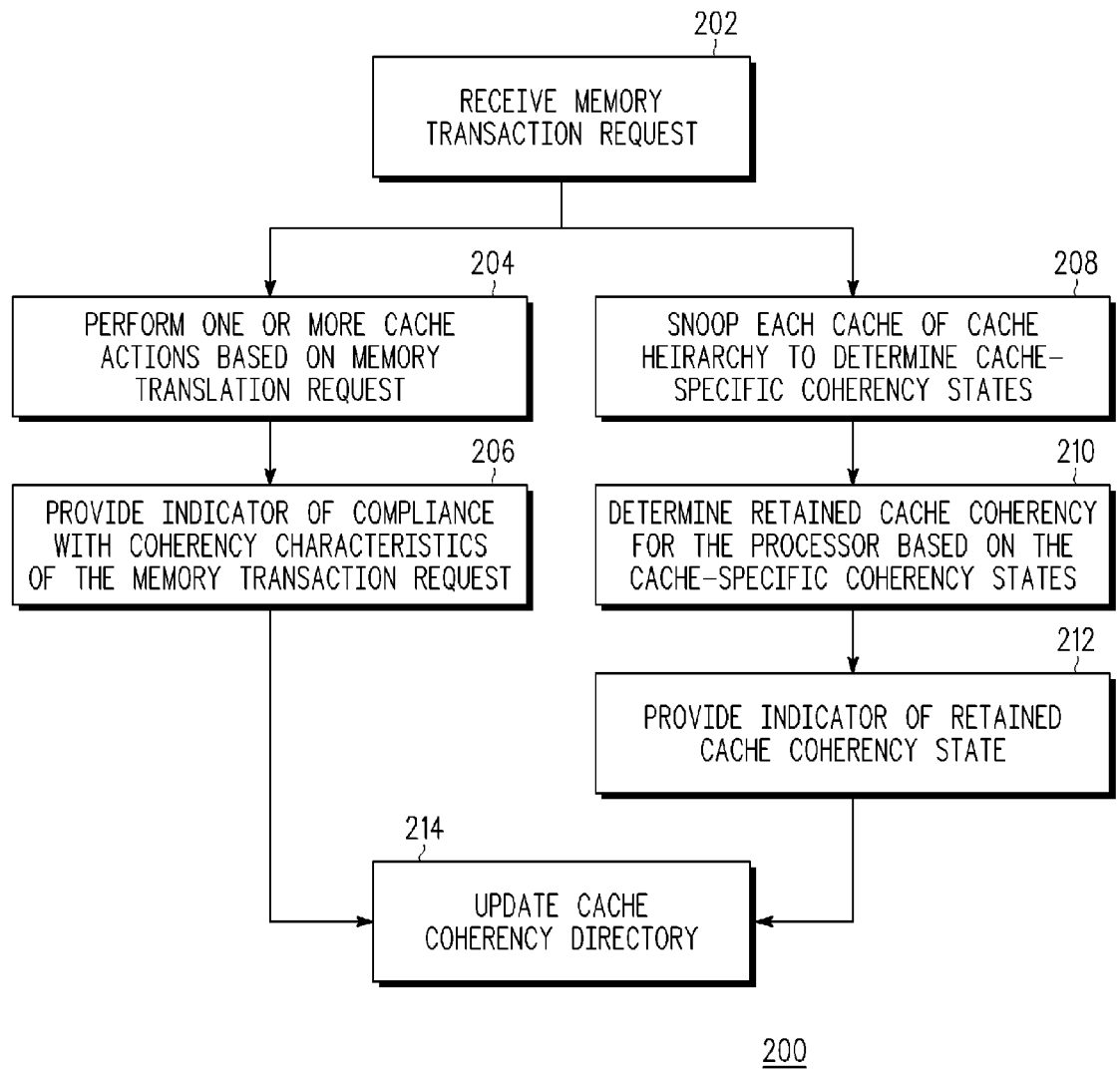
FIG. 2 is a flow diagram illustrating a method for updating a cache coherency state of a coherency granule in the multiple-processor system of FIG. 1 in accordance with at least one embodiment of the present disclosure.
Figure 3:
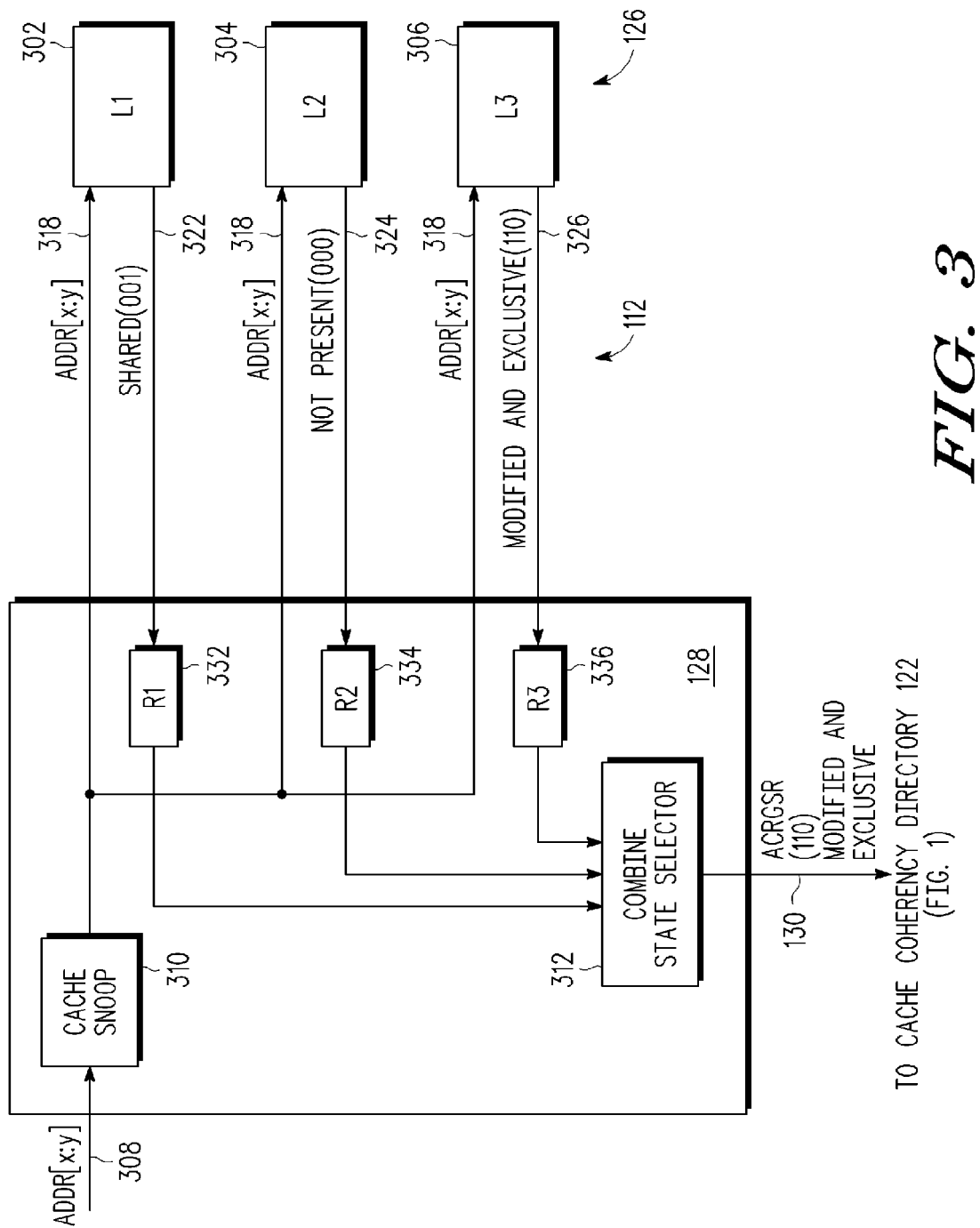
FIG. 3 is a block diagram illustrating a cache hierarchy and cache management module of a processor of the multiprocessor system of FIG. 1 in accordance with at least one embodiment of the present disclosure.

FIGS. 1-3 illustrate techniques for implementing cache coherency in a multiple-processor system utilizing shared memory. In one embodiment, a processor of a multiple-processor system having shared memory processes a memory transaction request by performing one or more cache actions based on the memory transaction request. As a result of the processing of the memory transaction request, the processor provides an indicator of its compliance with a coherency requirement of the memory transaction request. Further, the processor accesses its cache hierarchy to determine the local coherency state of the identified memory location for each cache in the cache hierarchy. The processor selects an overall coherency state for the memory location in the cache hierarchy from all of the cache-specific coherency states and provides the overall coherency state as the coherency state retained by the processor past the memory transaction for the identified memory location. The coherency state is received at a cache coherency directory, which utilizes the indicated processor coherency state to update one or more coherency tables.

A coherency granule is identified as the unit of data for which cache coherency is individually maintained. A coherency granule typically is associated with a corresponding range of memory addresses. For purposes of illustration, it is assumed herein that a coherency granule and a cache line are of equal amounts of data, such as, for example, 32 bytes, 64 bytes, 128 bytes, etc. In other implementations, a coherency granule can represent the state of more than one cache line, or the state of only a portion of a cache line.

FIG. 1 illustrates a multiple-processor system 100 in accordance with at least one embodiment of the present disclosure.

The multiple-processor system 100 includes a plurality of processing nodes 102, 104, 106, and 108 (hereinafter, processing nodes 102-108). As illustrated by processing node 102, some or all of the processing nodes 102-108 each includes a plurality of processors (e.g., processors 112 and 114), a node transaction management module 116, a local memory 118, an inter-node agent (INA) 120, and a cache coherency directory 122. For purposes of clarity, FIG. 1 omits components of the multiple-processor system 100 not directly related to coherency management, such as address busses, data busses, memory controllers, and the like.

The processors 112 and 114 each include a processor core 124, a cache hierarchy 126 and a local coherency management module 128. The processor core 124 includes one or more instruction execution pipelines to receive and execute instructions represented by instruction data and operand data retrieved from a shared memory (e.g., local memory 118) and stored in the cache hierarchy 126. The cache hierarchy 126 includes a plurality of local caches, such as, for example, L1 caches for instructions and data, L2 caches for instructions and data, and the like. The local coherency management module 128 is connected to the caches of the cache hierarchy 126. The local coherency management module 128 further is connected to the node transaction management module 116 via a port carrying signaling, including an address coherency response (ACR) signal 130 and an address coherency response granule state retained (ACRGSR) signal 132. Although an embodiment wherein the ACR signal 130 and the ACRGSR signal 132 are separate signals is described herein for illustrative purposes, it will be appreciated that in other embodiments the information represented by the ACR signal 130 and the information represented by ACRGSR signal 132 can be provided together as a single signal.

In one embodiment, the ACR signal 130 is used to provide an indicator representative of a compliance with a coherency requirement of a memory transaction request being processed by the corresponding processor. To illustrate, assume that the processor 112 receives a flush transaction intended to flush a cache line from each processor of the multiple-processor system 100. In this case, the coherency requirement of the flush transaction would be that the cache line is flushed from the processor 112. Accordingly, in response to processing a memory transaction request, the processor 112 provides an indicator representing whether the processor 112 is able to comply, or has complied, with the coherency requirement of the memory transaction as the ACR signal 130. Table 1 illustrates example indicators of coherency compliance that can be provided as the ACR signal 130.

TABLE 1

| ACR(0:3) | Response | Mnemonic | Semantics |
|---|---|---|---|
| 0000 | Transaction Error | T-Error | Transaction error. The error indicates a malformed transaction. The error could be: invalid type, unrecognized address by the system, invalid qualifiers, etc. |
| 0001 | Shared | S | The coherency granule is resident in this cache. Residence implies either a copy of the data belonging to the granule, or Reservation associated with the granule's address, or both. |
| 0010 | Modified Intervention | M-Int | This cache currently has a copy of the coherency granule that is modified with respect to memory (and therefore more recent). At most one cache hierarchy in the system my respond in this manner for any given transaction. |
| 0011 | Shared Intervention or Exclusive Intervention | S-Int or E-Int | This cache was the last to receive a copy of the coherency granule or has the coherency granule in an Exclusive state and therefore will provide a copy of the granule in response to the command. At most one cache hierarchy in the system may respond in this manner for any given transaction. |
| 0100 | Reserved | | |
| 0101 | Reserved | | |
| 0110 | Proxy Intervention | P-Int | A proxy device currently owns a modified copy of the coherency granule and therefore will provide a copy of the granule in response to the command. At most one cache hierarchy in the system may respond in this manner for any given reason. |
| 0111 | Null | Null | Default response by a device seeing the transaction. No other response is applicable. |
| 1000 | Reserved | | |
| 1010 | Modified Cast-Out | M-COut | This cache hierarchy is casting out a copy of the coherency granule that is modified with respect to memory (and therefore more recent). At most one cache hierarchy in the system may respond in this manner for any given transaction. |
| 1011-1111 | Reserved | | |

In one embodiment, the ACRGSR signal 132 is used to provide an indicator representative of a coherency state of a coherency granule that is retained by the cache hierarchy 126 after the memory transaction request is processed. In response to receiving a memory transaction request associated with a coherency granule, the local coherency management module 128 generates a set of cache-specific coherency states by snooping each cache of the cache hierarchy 126 to determine the coherency state of the coherency granule for the cache. Based on this set of cache-specific coherency states, the local coherency management module 128 determines an overall coherency state and provides the overall coherency state as the coherency state of the coherency granule retained by the processor after the memory transaction request is processed (hereinafter, "the retained cache coherency state") and provides an indicator of the retained coherency state as the ACRGSR signal 132. To illustrate using the previous flush transaction example, the coherency requirement of the flush transaction can be that a cache line is flushed from a processor's cache hierarchy. However, the reservation state of the cache line typically is not relevant to the coherency requirements for a flush transaction. Accordingly, if one of the caches of the cache hierarchy 126 intends to retain a reservation on a cache line of the coherency granule subsequent to performing a flush transaction associated with the cache line, the local coherency management module 128 can provide an indicator of the reservation status of the cache line (as the retained coherency state of the coherency granule for the processor) via the ACRGSR signal 132. Example indicators of retained coherency states that can be provided as the ACRGSR signal 132 are provided as Table 2, discussed below with reference to FIG. 3.

The inter-node agent 120 is connected to the node transaction management module 116 and the cache coherency directory 122 of the processing node 102, and further is connected to the inter-node agents of one or more of the other processing nodes 104, 106, and 108. In one embodiment, the inter-node agent 120 is configured to transfer coherency indicators from the local coherency management modules 128 of the processing node 102 to the cache coherency directory 122 to facilitate updating of one or more coherency tables 134 of the cache coherency directory 122, and further to facilitate access to the coherency tables 134 of the cache coherency directory 122 by the local coherency management module 128. Additionally, the inter-node agent 120 is configured to provide coherency indicators from the local coherency management modules 128 of the processing node 102 to the inter-node agents of the other processing nodes so that the other processing nodes can update their cache coherency directories. Likewise, the inter-node agent 120 is configured to receive coherency indicators from other processing nodes and transferring the received coherency indicators to the cache coherency directory 122 to facilitate updating the one or more coherency tables 134 based on the coherency information from other processing nodes represented by the received indicators. Further, the inter-node agent 120 is configured to transfer memory transaction requests between processing nodes. In the illustrated example, the processing nodes 102-108 are connected in a ring-type network arrangement. However, the processing nodes 102-108 can be connected in other network arrangements, such as a hub-and-spoke arrangement, without departing from the scope of the present disclosure.

The cache coherency directory 122 is connected to the inter-node agent 120 and includes one or more coherency tables 134 to store coherency state information for some or all coherency granules of local memory (or memories) that have been borrowed by another processing node. In one embodiment, the cache coherency directory 122 includes a plurality of the coherency tables 134, whereby each table is indexed based on a lower portion of a memory address associated with a memory transaction request received at the node transaction management module 116. Accordingly, each coherency table 134 includes a plurality of entries, each entry including an index field based on an upper portion of a memory address corresponding to a coherency granule and a field representing a coherency state for the coherency granule for the other processing nodes. In the example of FIG. 1, the coherency table 134 includes a field representing a coherency state for the coherency granule for the processing node 104 ("Node 1"), a field representing a coherency state for the coherency granule for the processing node 106 ("Node 2"), a field representing a coherency state for the coherency granule for the processing node 108 ("Node 3"). In one embodiment, the coherency table 134 further can include a field representing a system coherency state for the coherency granule. The system coherency state, in one embodiment, is selected as the most restrictive coherency state of the processing node-specific coherency states for the coherency granule.

FIG. 2 illustrates an exemplary method 200 of operation of the processing node 102 of the multiple-processor system 100 of FIG. 1 in accordance with at least one embodiment of the present disclosure. One or more of the processing nodes 104, 106, and 108 can operate in the same or similar manner.

At block 202, the processing node 102 receives a memory transaction request in response to the prefetching or execution of instructions. At block 204, each of the processors 112 and 114 (FIG. 1) processes the memory transaction request by performing one or more cache actions based on the memory transaction request. The cache actions can include, for example, a read action, a read-with-intent-to-modify action, a write action, an invalidate action, a flush action, a clean action, a claim-to-modify action, and the like. As a result of the processing of the memory transaction request, at block 206, each of the processors 112 and 114 provides an indicator representative of its compliance with one or more coherency requirements of the memory transaction request.

Further in response to receiving the memory transaction request at block 202, each of the processors 112 and 114 snoops each cache of the cache hierarchy 126 to determine respective sets of cache-specific coherency states for the coherency granule associated with the memory transaction request at block 208. At block 210, each of the processors 112 and 114 determines a retained coherency state of the processor based on the corresponding set of cache-specific coherency states. The determined retained coherency state represents the coherency state of the coherency granule retained by the processor after processing the memory transaction request. The retained coherency state can be determined from the cache-specific coherency states in any of a variety of manners. To illustrate, in one embodiment, the processors 112 and 114 each selects its most restrictive cache-specific coherency state of its respective set of cache-specific coherency states as the retained cache coherency state of the coherency granule for the processor. An example technique for selecting the most restrictive coherency state is described below with reference to FIG. 3. At block 212, each of the processors 112 and 114 provides an indicator representative of its respective retained cache coherency state to the cache coherency directory 122 (FIG. 1).

At block 214, the cache coherency directories 122 of the processing nodes 102-108 each update one or more of their coherency tables 134 based on the indicators provided at blocks 206 and 212. The coherency tables 134 can be updated by, for example, replacing the values representative of an old coherency state of the coherency granule for a processing node with a different value representative of the current coherency state of the coherency granule for the processing node, as well as by updating the system coherency state to reflect the current coherency state of the coherency granule in the event that the current coherency state for the processing node is the most restrictive current coherency state of all of the processing nodes of the multiple-processor system 100.

FIG. 3 illustrates an implementation of a portion of the a processor (e.g., processor 112) of the multiple-processor system 100 (FIG. 1) with respect to the determination of a coherency state of a coherency granule for the entire cache hierarchy 126 in accordance with at least one embodiment of the present disclosure. As illustrated, the cache hierarchy 126 includes a plurality of caches, such as, for example, a L1 unified (e.g., data and instruction) cache 302, a L2 unified cache 304, and a L3 unified cache 306 (hereinafter, caches 302-306). The local coherency management module 128 includes a cache snoop module 310, a combined state selector 312, a register 332, a register 334, and a register 336. The cache snoop module 310 includes an input to receive a memory address portion 308 (ADDR[x:y]) associated with a memory transaction request received by the processor 112. The cache snoop module 310 further includes an output to provide the memory address portion 308 to each of the L1 unified cache 302, the L2 unified cache 304, and the L3 unified cache 306 in response to receiving the memory address portion 308. The combined state selector 312 includes an input connected to each of the register 332, the register 334, and the register 336, and an output to provide the ACRGSR signal 132.

After receiving the memory address portion 308, the cache snoop module 310 snoops each of the caches 302-306 to determine the cache-specific coherency state for each cache. As part of the snoop of a cache, the cache snoop module 310 provides the memory address portion 308 as address signal 318 to each of the caches 302-306. Each of the caches 302-306 responds to the address signal 318 with the coherency state of the coherency granule within the cache. In FIG. 3, the coherency state for the L1 unified cache 302 is stored in the register 332, the coherency state for the L2 unified cache 304 is stored in the register 334, and the coherency state for the L3 unified cache 306 is stored in the register 336. The combined state selector 312, in one embodiment, accesses the cache-specific coherency states stored in the register 332, the register 334 and the register 336 and selects one to represent the overall coherency state of the associated coherency granule for the cache hierarchy 126 and thus the coherency state of the associated coherency granule for the processor 112.

In at least one embodiment, the combined state selector 312 selects the most restrictive cache-specific coherency state of the caches 302-306 as the overall coherency state. To illustrate, in one embodiment, the ACRGSR signal 132 is used to provide an indicator represented as a set of bits, where a first subset of the set of bits represents a reservation state of the coherency granule held by the cache hierarchy 126 and a second subset of the set of bits represents the shared state and the modified state of the coherency granule held by the cache hierarchy 126. For example, the indicator provided as the ACRGSR signal 132 can be represented as a four-bit signal, ACRGSR[0:4], where ACRGSR[0]=1 indicates that a reservation is held by the cache hierarchy 126 for the coherency granule and ACRGSR[0]=0 indicates that no reservation is held by the cache hierarchy 126. Further, the bits ACRGSR[1:3] can be coded according to Table 2, listed below, or another table.

TABLE 2

| ACRGSR[1:3] | Coherency State |
|---|---|
| 000 | Coherency granule not present |
| 001 | Coherency granule is being held in the Shared state |
| 010 | Coherency granule being held in the Shared/Shared with Last Reader (SL) state or the Exclusive state; currently unresolved |
| 011 | Coherency granule is being held in the Exclusive state |
| 100 | Reserved |
| 101 | Reserved |
| 110 | Coherency granule being held in Modified and Exclusive state |
| 111 | Reserved |

As illustrated by Table 2, the bit codings for the coherency state can be configured so as to increase in value as the relative restrictiveness of the coherency state increases such that the least restrictive coherency state (coherency granule not present) is coded as value "000" whereas the most restrictive coherency state, coherency granule held in Modified and Exclusive state, is coded as value "110". Accordingly, in such instances, the combined state selector 312 can select the most restrictive state of the cache-specific coherency states as the coherency state for the entire cache hierarchy 126 by selecting the maximum coding value of the cache-specific states. To illustrate by way of the example of FIG. 3, assume that the cache-specific coherency state for the L1 unified cache 302 is the Shared state (i.e., coding "001"), the cache-specific coherency state for the L2 unified cache 304 is the Not Present state (i.e., coding "000"), and the cache-specific coherency state for the L3 unified cache 306 is the Modified and Exclusive state (i.e., coding "110"). In this example, the combined state selector 312 would output a coding of "110" for ACRGSR[1:3] to reflect the most restrictive coherency state, i.e., Modified and Exclusive state, for the coherency granule in all of the caches 302-306 of the cache hierarchy 126.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   determining, at a first processor of a multiple-processor system, a coherency state of a coherency granule for each of a plurality of caches of the first processor to generate a first plurality of coherency states in response to receiving a memory transaction request associated with the coherency granule at the first processor;
   determining, at the first processor, a first coherency state of the coherency granule based on the first plurality of coherency states, the first coherency state representative of a coherency state retained at the first processor subsequent to the memory transaction request; and
   providing an indicator representative of the first coherency state for receipt by a cache coherency directory.

2. The method of claim 1, further comprising:
   updating the cache coherency directory based on the indicator of the first coherency state.

3. The method of claim 1, wherein determining the coherency state of the coherency granule for each cache of the plurality of caches comprises:
   snooping each cache of the plurality of caches to determine the coherency state of the coherency granule for the cache; and
   storing an indicator of the coherency state of the coherency granule for each cache of the plurality of caches in a corresponding storage location.

4. The method of claim 1, wherein determining the first coherency state comprises:
   determining a select coherency state of the first plurality of coherency states having the most restrictive coherency state of the first plurality of coherency states; and
   providing the select coherency state as the first coherency state.

5. The method of claim 4, wherein each of a plurality of potential coherency states is associated with a distinct value corresponding to a relative restrictiveness of the coherency state.

6. The method of claim 1, further comprising:
   determining, at a second processor of the multiple-processor system, a coherency state of a coherency granule for each of a plurality of caches of the second processor to generate a second plurality of coherency states in response to receiving the memory transaction request;

determining a second coherency state of the coherency granule based on the second plurality of coherency states, the second coherency state representative of a coherency state retained at the second processor subsequent to the memory transaction request; and providing an indicator of the second coherency state for receipt by the cache coherency directory.

7. The method of claim 1, further comprising:

performing a cache action in response to receiving the memory transaction request; and providing an indicator representative of a compliance with a coherency requirement of the memory transaction request for receipt by the cache coherency directory.

8. The method of claim 7, further comprising:

updating the cache coherency directory based on the indicator representative of the compliance with the coherency requirement.

9. A method comprising:

receiving, at a first processor of a multiple-processor system, a memory transaction request associated with a coherency granule;

processing the memory transaction request at the first processor;

determining a compliance with a coherency requirement of the memory transaction request;

determining a first coherency state of the coherency granule, the first coherency state representative of a coherency state retained at the first processor subsequent to the memory transaction request; and providing a first indicator representative of the compliance with the coherency requirement and a second indicator representative of the first coherency state for receipt by a cache coherency directory associated with the multiple-processor system.

10. The method of claim 9, further comprising:

updating the cache coherency directory based on the first indicator and the second indicator.

11. The method of claim 9, wherein determining the coherency state comprises:

snooping each cache of a plurality of caches of the first processor to determine the coherency state of the coherency granule for the cache;

determining a select coherency state having the most restrictive coherency state of the coherency states of the coherency granule for the plurality of caches; and providing the select coherency state as the first coherency state.

12. The method of claim 11, wherein each of a plurality of potential coherency states is associated with a distinct value corresponding to a relative restrictiveness of the coherency state and wherein determining the select coherency state having the most restrictive coherency state comprises selecting the select coherency state based on a value associated with each corresponding coherency state.

13. The method of claim 9, further comprising:

receiving, at a second processor of the multiple-processor system, the memory transaction request;

processing the memory transaction request at the second processor;

determining a compliance with the coherency requirement of the memory transaction request for the second processor;

determining a second coherency state, the second coherency state representative of a coherency state of the coherency granule retained at the second processor subsequent to the memory transaction; and providing a third indicator representative of the compliance with the coherency requirement for the second processor and a fourth indicator representative of the second coherency state for receipt by the cache coherency directory.

14. A system comprising:

a first processor comprising:

a port configured to couple to a transaction management module associated with a plurality of processors;

a processor core;

a plurality of caches; and a coherency management module configured to provide a first indicator representative of a first coherency state, first coherency state representative of a coherency state of a coherency granule retained at the plurality of caches subsequent to a processing of a memory transaction request associated with the coherency granule.

15. The system of claim 14, wherein the port is configured to receive the memory transaction request via the transaction management module.

16. The system of claim 14, wherein the coherency management module is configured to:

snoop each cache of the plurality of caches to generate a plurality of coherency states; and determine a select coherency state of the plurality of coherency states having the most restrictive coherency state of the plurality of coherency states, wherein the select coherency state represents a cache coherency state of the coherency granule retained by the first processor subsequent to the memory transaction.

17. The system of claim 14, further comprising:

a cache coherency directory coupled to the transaction management module, wherein the cache coherency directory is configured to update coherency information for the coherency module based on the first indicator.

18. The system of claim 14, wherein the coherency management module is configured to provide a second indicator representative of a compliance with a coherency requirement of the memory transaction request.

19. The system of claim 18, further comprising:

a cache coherency directory having an input to receive the first indicator and the second indicator, and wherein the cache coherency directory is configured to update stored coherency information associated with the coherency granule for the multiple-processor system based on the first indicator and the second indicator.

20. The system of claim 14, further comprising:

a second processor comprising:

a port configured to couple to the transaction management module;

a processor core;

a plurality of caches; and a coherency management module configured to provide a second indicator representative of a second coherency state, the second coherency state representative of a coherency state of the coherency granule retained at the plurality of caches of the second processor subsequent to a processing of the memory transaction request.

* * * * *